United States Patent
Cho et al.

(10) Patent No.: US 6,811,704 B2
(45) Date of Patent: Nov. 2, 2004

(54) METHOD FOR ANION REMOVAL BY FORMING CHEMICAL PRECIPITATION UNDER AN ELECTRIC FIELD AND CONTINUOUS PROCESS FOR ANION REMOVAL

(75) Inventors: Young-Sang Cho, Seoul (KR); Jae-Ik Kim, Seoul (KR); Jae-Chun Oh, Seoul (KR); Jin-Seong Yoon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 91 days.

(21) Appl. No.: 10/278,007

(22) Filed: Oct. 22, 2002

(65) Prior Publication Data

US 2003/0121861 A1 Jul. 3, 2003

(30) Foreign Application Priority Data

Nov. 1, 2001 (KR) ........................................ 2001-67893

(51) Int. Cl.[7] ................................................ C02F 1/62
(52) U.S. Cl. ...................... 210/681; 683/687; 683/713; 683/723; 683/726; 683/631; 683/724; 683/912; 423/122; 423/128; 423/129; 423/158; 423/165
(58) Field of Search ................................. 210/681, 683, 210/687, 723, 713, 726, 631, 724, 912; 423/122, 128, 129, 158, 165

(56) References Cited

U.S. PATENT DOCUMENTS

| | | | | |
|---|---|---|---|---|
| 3,959,133 A | * | 5/1976 | Fulton | 210/711 |
| 4,539,119 A | * | 9/1985 | Cann | 210/711 |
| 5,275,691 A | * | 1/1994 | Fukuta et al. | 216/93 |
| 5,443,730 A | * | 8/1995 | Letourneux et al. | 210/631 |
| 5,547,588 A | * | 8/1996 | Hassett et al. | 210/724 |
| 5,695,646 A | * | 12/1997 | Graf | 210/716 |
| 6,280,630 B1 | * | 8/2001 | Ramsay | 210/711 |

* cited by examiner

Primary Examiner—Duane Smith
Assistant Examiner—Minh-Chau T. Pham
(74) Attorney, Agent, or Firm—Darby & Darby

(57) ABSTRACT

The present disclosure relates to a method for removing anions such as nitrate ion, sulfate ion, chloride ion, and phosphate ion existing in underground water, surface water or waste water. The method involves adding alumina cement and a calcium compound to the water containing the anion followed by applying an electric field thereto, thereby forming a chemical precipitate which is an insoluble complex salt. The disclosure also relates to a continuous process for removing the anion by continuously performing the above method for removing anions.

6 Claims, 1 Drawing Sheet

METHOD FOR ANION REMOVAL BY FORMING CHEMICAL PRECIPITATION UNDER AN ELECTRIC FIELD AND CONTINUOUS PROCESS FOR ANION REMOVAL

BACKGROUND OF THE INVENTION

1. Field of the Invention

The present invention relates to a chemical precipitation method for precipitating anions such as nitrate ion, sulfate ion, chloride ion and phosphate ion contained in underground water, surface water or waste water, as insoluble complex salts by reacting the anions with alumina cement and a calcium compound, and to a continuous process for removing the anions.

2. Description of the Background Art

Generally, a compound containing nitrogen and phosphorous has been identified as a substance to accelerate growth of plants, and thereby to become a main element accelerating eutrophication of rivers, lakes and seas. Therefore, researches into ways of removing nitrate ion and phosphate ion in underground water, surface water or waste water have been performed in earnest since 1960's. Especially, researches for removing nitrate ion which has been known as causing cyanosis of infants have been highlighted in water-treatment field recently.

In the waste water having high nitrate ion concentration, its concentration generally can be lowered by being diluted with water having lower nitrate ion concentration. However, when the water having lower nitrate ion concentration is difficult to use, a reaction for removing nitrate ion is needed. Examples of techniques used for removing nitrate ion include ion-exchange extraction, biological denitration, chemical reduction and electric dialysis, etc. Among them, the ion-exchange extraction and the biological denitration can be actually used for large-scale water treatment.

The ion-exchange extraction is a physical and chemical treatment process requiring reproduction of resin regularly. Sodium chloride or sodium bicarbonate is used for reproducing used-up resins, and consequently, the waste solution concentrated with high concentration of nitrate ion, sodium chloride or sodium bicarbonate should be re-treated or wasted. However, it is difficult to waste the waste solution excessively due to interests and regulations on the environment. Therefore, it is difficult to apply the above process widely. Another problem is in that it is difficult to remove nitrate salt selectively from the underground water which contains a lot of other anions besides nitrate ion. For example, when nitrate ion, sulfate ion, chloride ion, etc. exist simultaneously, it is difficult to remove nitrate ion only, and therefore, nitrate ion removing efficiency is lowered. Especially, when sulfate ion and nitrate ion are exchanged with the chloride ion existed in the resin, the amount of chloride which may cause corrosion of a pipe is increased in the treated water. Occasionally, the amount of chloride may exceed a criterion of chloride content, 200 mg/liter, in water which can be used as a drinking water. Besides, the amount of sodium chloride which is used for reproducing the ion exchange resin is increased, thereby to cause another environmental problem. That is, although the ion-exchange extraction is the best method in view of cost, due to the difficulties in processing concentrated byproducts, such method can be applied only in a seashore area or in an area having no possibility of eutrophication. Also, since a lot of salts should be added, the operational cost is increased. In addition, high concentration of chloride ion in the treated water may cause corrosion.

The biological denitration has been known as a method producing no byproduct and as an economic method, and therefore, used for purifying waste water or outflow of septic tank. This method uses a principle that denitration bacteria reduces nitrate ion to nitrogen gas when an organic substrate is present. The substrate widely used in this method is methanol which has low price and high efficiency. However, in this method, time required for growing up of the bacteria and temperature of reactor affect greatly on the anion removing efficiency. In addition, it is difficult to control conditions since methanol has to be supplied carefully so as to be used relevantly. And blockage due to the growth of the bacteria may happen regularly. Also, there are many problems to be solved such as post-process, problems caused by carbon source and a necessity of sensitive control.

Besides the above methods, chemical reduction of nitrate ion with ferrous hydroxide has been mainly researched in the U.S.A. Ferrous sulfate has been known as the most economic form among various substances having a reducing ability. 1–5 ppm of copper or silver should be used as a catalyst for reducing nitrate ion with a metallic iron. The largest amount of nitrogen gas is obtained at pH 8.0, and remainder is reduced to ammonia. However, this method is disadvantageous in that complete reduction of nitrate ion to nitrogen gas is difficult to be achieved, and metallic iron has to be used too much.

As a method for removing anions containing nitrate ion more economically by solving the problems of the prior art, the present inventors have suggested a chemical precipitation method using alumina cement and burned lime (Korean Patent No. 242994). According to this method, hydration rate of alumina cement can be lowered by adding a small amount of sulfate salt in a process of complexing the alumina cement and the burned lime with nitrate anion, by which the amount of alumina cement wasted by the hydration reaction is reduced and the amount used for forming complex salt is increased. Consequently, the amounts of the alumina cement and the burned lime used can be reduced. Therefore, this method is more economic method for removing nitrate ion than other methods without using sulfate. However, in spite of the above improvements, it is discovered that additional reduction of the amount of materials used in chemical precipitation method such as the alumina cement and the burned lime is required in order to ensure economic efficiency for a commercial use.

The complexation of a calcium compound such as alumina cement and burned lime or hydrated lime with an anion has been known to be competitive with the hydration of the calcium compound with a water molecule. That is, a position which can be reacted in the structure of the alumina cement can be competitively occupied by an anion or a water molecule to react. If the reaction with water molecules is relatively superior to that with anions, the efficiency of the complexation of the anion is lowered. Therefore, in order to increase the efficiency of the complexation with anions, the activity of the anions should be increased to an appropriate level so that the complexation can ensure relatively superior position.

SUMMARY OF THE INVENTION

Therefore, an object of the present invention is to provide a method for removing anions contained in underground water, surface water or waste water through a chemical precipitation method for anions which is able to increase an efficiency of anion complexation and to reduce the amount of materials used greatly.

Another object of the present invention is to provide a continuous process for removing anions using the above chemical precipitation method.

The above and other objects of the present invention can be achieved by providing a chemical precipitation method, in which an electric field is applied to a complexation reactor so as to increase the activities of anion and calcium ion in the complexation reactor to an appropriate level, thereby to improve efficiency of anion complexation as twice as that of the prior art.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawing, which is included to provide a further understanding of the invention and is incorporated in and constitute a part of this specification, illustrates Examples of the invention and together with the description serve to explain the principles of the invention.

In the drawing.

DETAILED DESCRIPTION OF THE INVENTION

Figure 1:
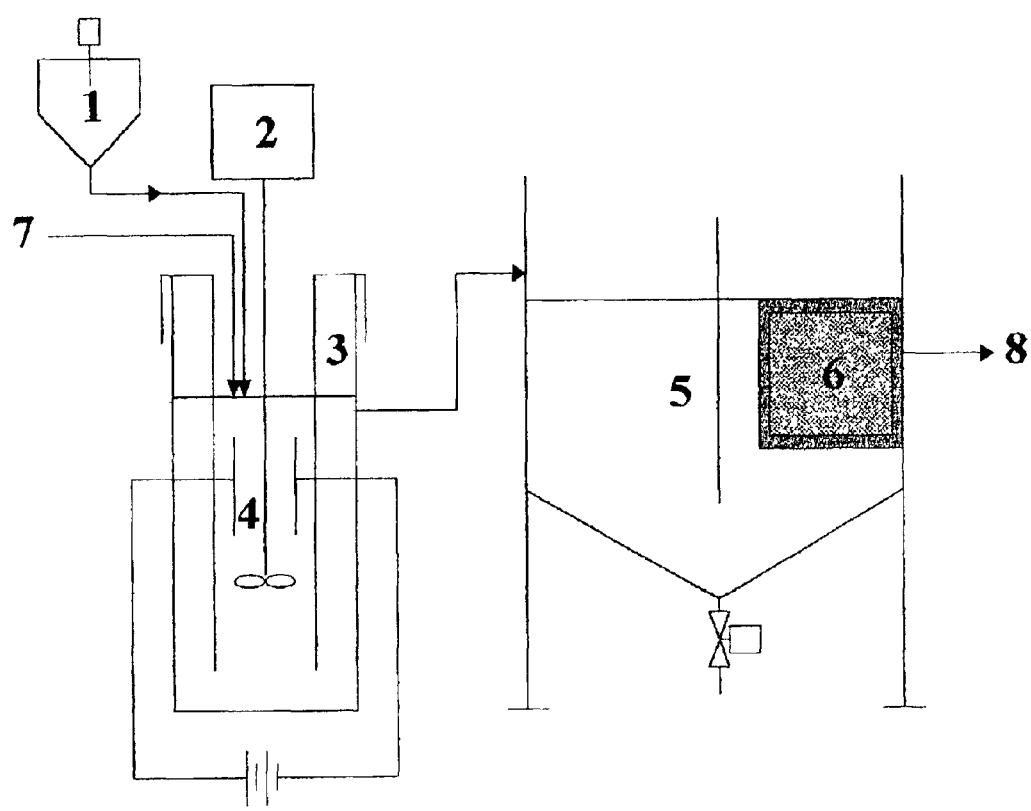
FIG. 1 is a block diagram showing an apparatus comprising an electric field reactor and a precipitation filtering chamber for embodying a continuous process for removing chemical precipitation of anion according to the present invention.

The present invention uses a phenomenon that if an electric field of appropriate intensity is applied to the reactor, the electric force is selectively applied to anions and calcium ions which are electrically charged, and accordingly, the activities of anions and calcium ions are relatively increased. The chemical precipitation method and process for removing anions according to the present invention comprises mixing commercially available alumina cement with a calcium compound at a predetermined ratio, adding the mixture into underground water, surface water or waste water containing anions, and followed by applying an electric field to the reactor while stirring the water.

It is preferred that the mixing ratio of alumina cement and the calcium compound such that alumina cement/calcium ratio is 1.0–4.0 by weight. Better result can be obtained when the ratio is 2.0–3.0. It is desirable that the amount of mixture consisting of alumina cement and the calcium compound used for removing 1 equivalent of anion is 100 g–450 g. Better result can be obtained when 200–300 g of the mixture is used. It is desirable that electrical current in the electric field is 0.01 A–0.5 A. Better result can be obtained when the current is 0.05 A–0.2 A. The calcium compound used in the present invention may be a burned lime or hydrated lime.

Anions which can be removed from the underground water, the surface water or the waste water according to the present invention include nitrate ion, phosphate ion, sulfate ion, chloride ion, nitrite ion, sulfite ion and the like. The present invention can be applied when the above ions exist together in underground water, surface water or waste water, as well as when each anion exists respectively.

Reference will be now made in detail to the preferred embodiments of the present invention, examples of which are illustrated in the accompanying drawings.

An apparatus for continuous process for anion removal according to the present invention is shown in FIG. 1. Major reference numerals in FIG. 1 are as follows:

| 1: powder supplying device | 2: stirrer |
|---|---|
| 3: reactor | 4: electrode |
| 5: precipitation chamber | 6: filter |
| 7: polluted water | 8: treated water |

As shown in FIG. 1, the apparatus for the the present invention comprises an annular type reactor 3 and a precipitation chamber 5 including a filter 6. The precipitation chamber equipped with the filter can be divided into a precipitation chamber and a filtering chamber. In order to prevent a pre-hydration of alumina cement, a powder supplying device 1 is required for supplying alumina cement in powder not in a solution. While alumina cement and calcium compound together with polluted water which will be treated are put into the reactor 3, mixed and then stirred at a constant rate, precipitation of salt components contained in the polluted water and hydration of the alumina cement take place in the reactor. From the initial stage to the end point of the reaction, the electric field is applied into the reactor by adding static voltage through an electrode 4, and electric current in an appropriate intensity is flowed in order to control the reaction rate. Insoluble compound and sludge formed inside the reactor 3 are moved to the precipitation chamber 5 including the filter 6 to precipitate therein. In the precipitation chamber 5 equipped with the filter 6, precipitation is occurred naturally, and at the same time, the sludge accumulated on the filter 6 is reverse-permeated and re-precipitated regularly, and thereby, efficient precipitation and filtering can be achieved in one unit process.

The method according to the present invention as described above is able to reduce problems such as a necessity of additional use of salt and corrosion caused by the salt existed in treated water, compared to the conventional ion-exchange extraction method. In addition, a high construction cost due to a low reaction rate in the biological denitration method can be reduced. The post-processing load can be also reduced. Even when anions in a higher concentration than 1000 ppm exist, the polluted water can be treated at a higher reaction rate without dilution process. Therefore, the present invention can be applied effectively for removing salts existed in general industrial wastewater. Moreover, the present invention can be applied for removing nitrate ion existed in toxic wastewater in which the biological denitration method can not be applied.

The sludge obtained in the precipitation process of the present invention contains a lot of anions. Therefore, it can be used as a slow release fertilizer for modifying acid soil, or regenerated as a cement or re-used as a reactant in the processes of the present invention through the baking process. Thereby, the maintaining cost can be reduced to the highest degree.

EXAMPLES

Hereinafter, the present invention will be described in more detail with reference to the following Examples. However, the Examples are to illustrate the present invention, and not to limit the scope of the present invention thereto.

Example 1

Table 1 shows concentrations of remained nitrate ion according to added amounts of alumina cement and hydrated lime when the experiment was performed under an electric field, and when the experiment was performed without applying an electric field. Experimental procedures were as follows.

After 1000 ml of waste water in which 1000 ppm of nitrate ion was dissolved was put into a reactor, alumina cement and hydrated lime were respectively added into the reactor while changing the added amounts. Complexation was performed while stirring for a predetermined time. The experiment using an electric field was performed while applying the electric field to the reactor with a platinized titanium electrode in the same condition as described above.

While the reaction was proceeded, the stirring speed was maintained to be higher than 1000 rpm, and temperature of reactor was maintained constant at 25±1° C. In addition, when the electric field was applied, the current flowing between both electrodes was maintained to be 0.1A.

After 1 hour was passed since the reaction had started, respective nitrate ion concentration was measured and results are shown in Table 1. In Table 1, the base is a value when 10.48 g of alumina cement and 4.8 g of hydrated lime were added for 1 l of waste water. ½, ⅓ and ⅕ of base in Table 1 means that the alumina cement and the hydrated lime were used as ½, ⅓ and ⅕ of base, respectively. That is, in the case of ½ of base, it means that 5.24 g of alumina cement and 2.4 g of hydrated lime were used.

As shown in Table 1, the rate of removing nitrate ion when the electric field was applied was much higher than when the electric field was not applied.

TABLE 1

|  | Base amount | ½ of base | ⅓ of base | ⅕ of base |
|---|---|---|---|---|
| With electric field | 122 ppm | 180 ppm | 304 ppm | 385 ppm |
| Without electric field | 125 ppm | 368 ppm | 519 ppm | 692 ppm |

Reference Example 1

Table 2 shows concentrations of remained nitrate ion when the alumina cement and burned lime were used and when the alumina cement and hydrated lime were used. In both cases of using burned lime and using hydrated lime, the amounts of alumina cement used were 5.24 g for 1 l of waste water. When the burned lime was used, its amount was 2.5 g. When the hydrated lime was used, its amount was 2.4 g. Other experimental conditions were the same as the electric field was not applied in Example 1.

TABLE 2

|  | 10 min. | 20 min. | 40 min. | 60 min. | 120 min. |
|---|---|---|---|---|---|
| Burned lime | 747 ppm | 625 ppm | 530 ppm | 411 ppm | 332 ppm |
| Hydrated lime | 580 ppm | 498 ppm | 396 ppm | 328 ppm | 241 ppm |

As shown in Table 2, the ratios and rates of ion removal when the hydrated lime was used were higher than those when the burned lime was used.

Example 2

Table 3 shows efficiencies of nitrate ion removal according to changes of electrical current. The amount of alumina cement and hydrated lime used were 5.24 g and 2.4 g for 1 l of waste water, respectively. Other experimental conditions were the same as the electric field was applied in Example 1.

TABLE 3

| Electrical current (A) | 0.1 | 0.2 | 0.3 | 0.4 | 0.5 |
|---|---|---|---|---|---|
| Efficiency of nitrate ion removal (%) | 86 | 76 | 72 | 68 | 64 |

As shown in Table 3, the maximum value of the nitrate ion removal efficiency exhibited at 0.1 A of electric current (86%). However, it was discovered that there would be an appropriate intensity since the efficiency was reduced as the electric current was increased gradually.

Example 3

Table 4 shows concentrations of remained anions when various anions existed in waste water. The initial concentrations were $SO_4^{2-}$ 3700 ppm, $PO_4^{3-}$ 3700 ppm and $Cl^-$ 300 ppm. 5.24 g of alumina cement and 2.4 g of hydrated lime were used for 1 l of waste water. Other experimental conditions were the same as in Example 1.

TABLE 4

|  | $SO_4^{2-}$ | $PO_4^{3-}$ | $Cl^-$ |
|---|---|---|---|
| Concentration of remained anion when electric field is applied | 1237 ppm | 0 ppm | 124 ppm |
| Concentration of remained anion when electric field is not applied | 2297 ppm | 0 ppm | 234 ppm |

As shown in Table 4, it was discovered that various anions which were present at the same time could be also removed, and the efficiency of anion removal in which the experiment was performed under electric field was higher.

Example 4

Table 5 shows concentrations of remained nitrate ions according to the time when the alumina cement and the hydrated lime were put into the reactor continuously using the powder supplying device, as shown in FIG. 1. The experimental procedures were as follows:

The waste water in which 1000 ppm of nitrate ion was dissolved was put into 1 l reactor 7 at a rate of 17 ml/m. Alumina cement and hydrated lime were put into the reactor 7 using the powder supplying device 1 at the rates of 5.24 g/h and 2.4 g/h, respectively. While the electric current in the electric field was maintained at 0.1 A, stirring was continued at a speed of higher than 1000 rpm. The insoluble compound and sludge formed inside the reactor were moved to the precipitation chamber 5 equipped with the filter 6, to precipitate the insoluble compound and sludge therein.

TABLE 5

| Time (min) | 0 | 30 | 60 | 90 | 120 | 150 | 180 | 210 | 240 | 270 | 300 |
|---|---|---|---|---|---|---|---|---|---|---|---|
| Concentrations (ppm) | 1,000 | 442 | 332 | 240 | 220 | 170 | 154 | 142 | 146 | 148 | 149 |

As shown in Table 5, the ratio of nitrate ion removal in the continuous process was maintained similar to those of the batch type process.

According to the process for removing anions by chemical precipitation using complexing reactor under an electric field of the present invention, the amounts of alumina cement and calcium compound used can be reduced to 50% compared to that of the prior art, and superior efficiency in anion removal can be achieved.

As the present invention may be embodied in several forms without departing from the spirit or essential characteristics thereof, it should also be understood that the above-described Examples are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for removing an anion existing in underground water, surface water or waste water, comprising adding alumina cement and a calcium compound to the water containing the anion, followed by applying an electric field of an electric current in the range of 0.01 A–0.5 A thereto, thereby forming a chemical insoluble complex salt precipitate.

2. The method according to claim 1, wherein the ratio of the alumina cement to the calcium compound is 1.0–4.0 by weight.

3. The method according to claim 1, wherein 100–450 g of mixture of the alumina cement and the calcium compound is added for 1 equivalent of the anion.

4. The method according to claim 1, wherein the calcium compound is burned lime or hydrated lime.

5. The method according to claim 1, wherein the anion is selected from the group consisting of nitrate ion, phosphate ion, sulfate ion, chloride ion, nitrite ion, sulfite ion and mixtures thereof.

6. A continuous process for removing an anion comprising performing the method according to claim 1 continuously in order to reduce the concentration of the anion to a desired level.

* * * * *